United States Patent [19]
Cooley, Jr.

[11] Patent Number: 5,878,980
[45] Date of Patent: Mar. 9, 1999

[54] ATTENUATION RING

[75] Inventor: Howard H. Cooley, Jr., Culver City, Calif.

[73] Assignee: Hughes Electronics Corporation, Los Angeles, Calif.

[21] Appl. No.: 792,350

[22] Filed: Feb. 5, 1997

[51] Int. Cl.$^6$ .................................................. B64G 1/64
[52] U.S. Cl. .......................... 244/172; 244/63; 248/573; 248/634; 267/141.3
[58] Field of Search .............................. 267/141.2, 141.3; 244/63, 158 R, 172; 248/560, 573, 634

[56] References Cited

U.S. PATENT DOCUMENTS

| | | | |
|---|---|---|---|
| 3,167,294 | 1/1965 | Andrews et al. ..................... | 267/141.3 |
| 4,682,744 | 7/1987 | Gounder ............................... | 244/172 X |
| 4,755,154 | 7/1988 | Ewbank .............................. | 248/634 X |
| 5,389,746 | 2/1995 | Moody . | |
| 5,529,264 | 6/1996 | Bedegrew et al. ..................... | 244/63 X |

*Primary Examiner*—William Grant
*Attorney, Agent, or Firm*—Terje Gudmestad; Georgann S. Grunebach; Michael W. Sales

[57] ABSTRACT

An attenuation ring assembly for mounting between the payload section and the booster section of a launch vehicle is disclosed. The ring assembly acts as a transient filter to delete or minimize harmful shock and vibration frequencies which might otherwise reach and possibly damage delicate electronic components and the like in the launch vehicle payload.

10 Claims, 2 Drawing Sheets

5,878,980

ATTENUATION RING

TECHNICAL FIELD

The present invention relates to shock and vibration isolation and, more particularly, to an attenuation ring positioned between the booster and the payload of a launch vehicle to prevent shock and vibration transients created in the booster from reaching or adversely affecting sensitive components in the payload.

BACKGROUND ART

The prior art is replete with applications devised to provide isolation from shock and vibration. Such systems have been provided to reduce shock and vibration in such varied areas as shipping containers, automotive and aircraft engine motor mounts as well as chassis mounts. Electronic equipment in particular is susceptible to shock and vibration. As a result, various methods and devices have evolved to provide isolation and protection for delicate electronic components. Known techniques include redesigning the components to make them "sturdier", utilizing spring mounted platforms, and/or using elastomers which provide a dampening effect on shock and vibration transients. Some of these known techniques, however, result in weight, expense and space penalties.

In the area of launch vehicles, the known techniques have not been readily utilized or adapted for a variety of reasons. At the present time, launch vehicle payloads are generally mounted in a metal-to-metal manner adjacent the vehicle booster or, at most, with an elastomeric "O" ring or the like positioned around the mounting circumference. However, the purpose of the O-ring is primarily for sealing rather than shock isolation, and in fact, provides minimal shock and vibration protection.

As a result, shock and vibration transients resulting from launch or other movement of the vehicle are transmitted directly to the payload. Such lack of shock isolation in present use generally results in a damping factor of approximately 1% of the required critical damping of the system with an amplification factor (Q) of 50. Thus, the resonant amplification or transmissibility, i.e., the amount of vibration transmitted to the isolated equipment through the mounting system, is extremely high, requiring designing the payload for high transient loading, particularly during lift-off and separation.

Another drawback of known methods of mating boosters and payloads is that expensive and lengthy load cycle testing of each mated configuration must be performed before such mating systems can be utilized.

SUMMARY OF THE INVENTION

It is an object of the present invention to provide a mechanism for minimizing or deleting shock and vibration in a spacecraft or satellite launch vehicle. It is another object of the present invention to minimize the amount of shock and vibration from the booster section of a launch vehicle from being transmitted to the payload section.

These and other objects are met by the present invention which is directed to a shock and vibration isolation system for a satellite launch vehicle and comprises an attenuation ring assembly fitted to the circumferential mating interface between the booster and payload. The attenuation ring assembly has inner and outer rings joined by an elastomeric material. For maximum vibration attenuation, the elastomer is positioned in shear.

The outer ring is designed to mount on the circumferential mating surface of the booster member and the inner ring is designed to mount on the circumferential mating surface of the payload member.

The elastomer material is positioned between the inner and outer rings and, preferably, the assembly is heated to obtain adhesion between the two rings. An anti-rotation mechanism, such as a guide pin, spline or the like, can also be utilized to prevent the outer ring and inner ring from rotating relative to one another.

The attenuation ring assembly may be mounted over the entire circumferential payload booster interface or, to save weight, may be manufactured and mounted in arc segments. The ring assembly permits limited motion with in creased damping wherein the elastomeric material placed in shear can provide up to 15% of critical damping, resulting in an amplification factor of 3.3, greatly reducing the resonant amplification or transmissibility of vibration between the booster and the payload.

Additionally, the attenuation ring assembly permits a payload to be mounted on different boosters without the requirement for costly and lengthy load cycle analysis and testing.

The above object and other objects, features and advantages of the present invention will become readily apparent to persons of ordinary skill in the art based on the following detailed description of the best mode for carrying out the invention when taken in connection with the accompanying drawings and appended claims.

BEST MODES FOR CARRYING OUT THE INVENTION

Figure 1:
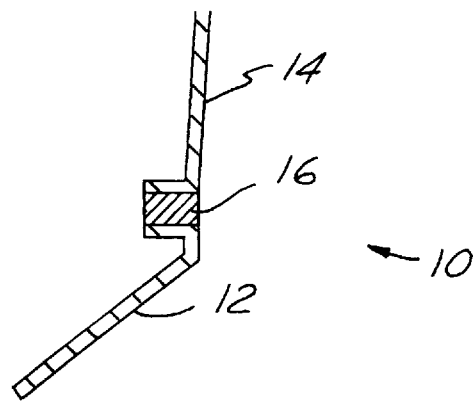
FIG. 1 is a cross-sectional view of a sealing member used in the prior art.

FIG. 1 depicts a representative known system for mating a payload to a booster of a satellite launch vehicle. The launch vehicle 10 generally has the booster section 12 and a payload section 14 mated in either a metal-to-metal abutment or, as shown, with a seal or "O-ring" 16 positioned between them. The seal 16 is primarily used to provide a seal between the two components. As a result, and referring now to FIG. 2, the transmissibility "Q" of known payload-booster mating systems 18 is extremely high, approaching 50 as the vibration or shock frequency approaches the natural frequency the system. This requires added protection for delicate electronic instruments in the payload.

Figure 3:
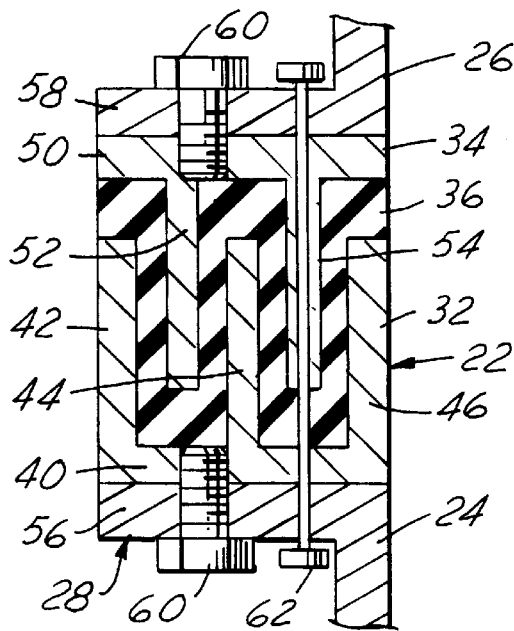
FIG. 3 is a cross-sectional view of a first embodiment of the present invention.

The present invention addresses the problems with known mating connectors. A first embodiment of the present invention is shown in FIG. 3 and is generally referred to by the reference numeral 20. The system 20 includes an attenuation ring assembly 22 which is positioned in a mating configuration circumferentially around and at the interface between the booster section 24 and the payload section 26 of a launch vehicle 28.

Figure 2:
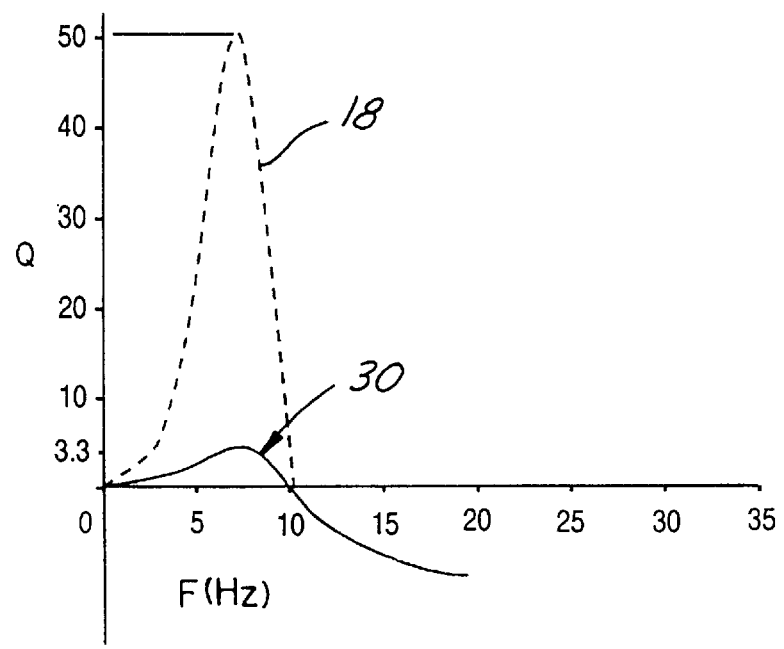
FIG. 2 is a transmissibility curve comparing the transmissibility "Q" for known devices with the present invention.

The attenuation ring assembly 22, when properly constructed and positioned, can reduce the transmissibility "Q" of the system to a value as low as 3.3 as shown by curve 30 in FIG. 2.

Still referring to FIG. 3, the attenuation ring assembly 22 includes a circular outer mounting ring member 32 which mounts to the booster section 24, a circular inner mounting ring member 34 which mounts to the payload 26, and an elastomeric material 36. The outer mounting ring member 32 is annular, with its narrowest dimension laying in the radial plane, and has a general "W" cross-sectional shape. The ring member 32 includes a flat annular base member 40 having three upstanding or generally perpendicular flanges, an outer flange 42, a middle flange 44, and an inner flange 46. Each of the flanges extends circumferentially around the annular base plate 40.

The inner mounting ring member 34 is also annular, with its narrowest dimension in the radial plane, and has the cross-sectional shape of the Greek letter "π". The ring member 34 includes a flat annular base 50 having two downwardly extending or generally perpendicular flanges, an outer flange 52, and an inner flange 54. The two flanges 52 and 54 extend circumferentially around the annular base plate 50.

The outer and inner mounting ring members 32 and 34 are positioned to interleave flange 52 between flanges 42 and 44 and interleave flange 54 between flanges 44 and 46. A test jig is used to hold the mounting rings 32,34 in position as the elastomeric material 36 is inserted or injected into the spaces between the juxtaposed flanges. Heat is applied to cause adhesion between the elastomer member 36 and the mounting rings 32 and 34. When cured, the elastomer member 36 is mounted in shear to maximize the dampening effect of the attenuation ring assembly 22.

The completed attenuation ring assembly 22 is then suitably positioned between the booster section 24 and payload section 26 with the outer mounting ring base 32 suitably fastened to booster mounting flange 56 and the inner mounting ring base 50 suitably fastened to payload mounting flange 58. One suitable method of attachment is through the use of suitable fasteners, such as bolts 60.

Figure 4:
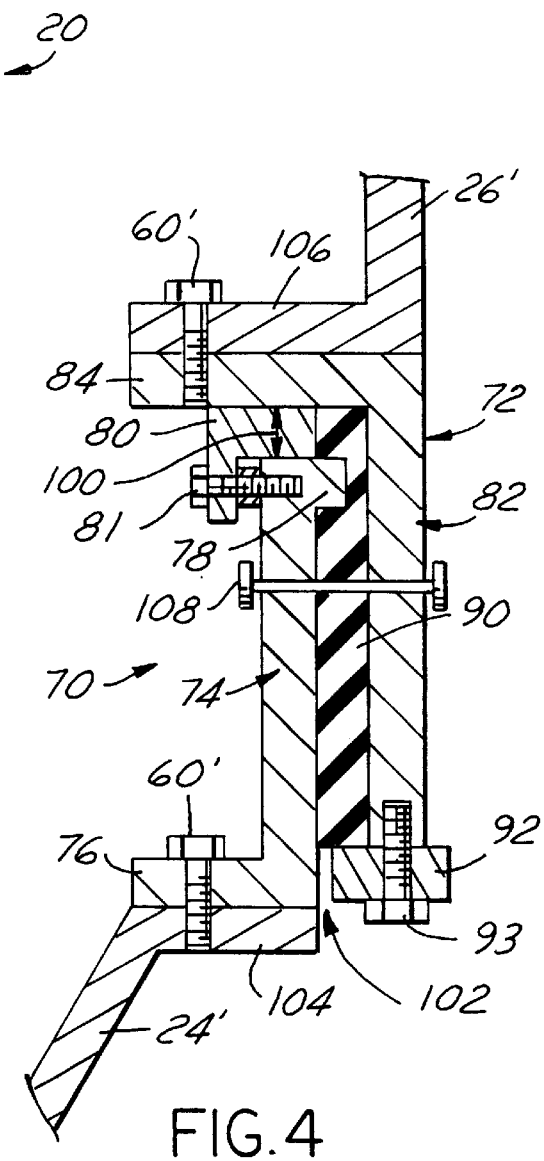
FIG. 4 is a cross-sectional view of a second embodiment of the present invention.

Another embodiment 70 of the invention is shown in FIG. 4. The attenuation ring assembly is depicted generally by the reference numeral 72. Attenuation ring assembly 72 includes an annular outer mounting ring 74 with its narrowest dimension perpendicular to the radius of the assembly. A mounting flange 76 is formed on a first edge of mounting ring 74 and extends radially outward therefrom. Flange 76 is used to attach the attenuation ring to the booster section 24' of the launch vehicle. For attachment purposes, any conventional mechanism or means can be utilized, such as fasteners 60'.

A sway space limiting member 78 is provided on the second edge of outer mounting ring 74 and extends radially inwardly. Motion lockout spacer members 80 are fastened to the edge of outer mounting ring 74 proximate to the sway space limiting member 78. Preferably, a plurality of spacer members 80 are positioned around the periphery of the attenuation ring assembly. The members 80 can be mounted to the ring 74 by any conventional fastener means, such as shoulder bolts 81.

Attenuation ring assembly 72 further includes an annular inner mounting ring 82 having its narrowest dimension perpendicular to the radius. A mounting flange 84 is formed at one edge of the ring 82 and extends radially outward. Flange 84 is used to attach the attenuation ring to the payload section 26' of the launch vehicle, such as by fasteners 60'.

The ring members 74 and 82 are assembled with the inner mounting ring 82 positioned inside outer mounting ring 74 and with the mounting flange 84 separated from the sway space limiting member 78 by motion lockout spacer member 80. For assembly, the ring members 74 and 82 are held in place in jigs or tooling fixtures (not shown) and elastomeric material 90 is inserted or preferably injected into the cavity between the ring members 74 and 82 and heated to obtain adhesion between the ring member and the elastomer. Again, the elastomer material 90 is mounted in shear, enhancing the shock and vibration dampening of the attenuation ring 70. Also, an annular fail-safe ring 92 is attached to the edge of inner mounting ring 82 proximate to outer mounting ring flange 76 and abutting the cured elastomer 90. This provides positive axial entrapment for the bonded rings 74 and 82.

The fail-safe ring 92 can be fastened to the mounting ring 82 in any conventional manner, such as by fasteners 93. The fail-safe ring 92 also can be provided as one continuous annular ring around the attenuation ring assembly, or the fail-safe ring 92 can be comprised of a plurality of arcuate-shaped members.

Radial and axial motion between the booster section 24' and the payload section 26' are controlled by gap 100 formed at the payload end of ring assembly 70 upon removal of the motion lockout spacer member 80, and by gap 102 formed between fail-safe ring 92 and the outer mounting ring 74.

The completed attenuation ring assembly 70 is suitably positioned between the booster section 24' and the payload section 26' with the outer ring mounting flange 74 positioned against booster mounting flange 104 and suitably fastened together. Payload mounting flange 106 is then positioned against inner ring mounting flange 82 and suitably fastened.

The motion lockout spacers 80 are used during transportation of the launch vehicle to the launch site. They prevent movement of the mated payload and booster sections during such transportation. The motion lockout spacers 80 are removed prior to the actual launching of the vehicle. The motion lockout spacer members 80 also prevent creep from occurring during the period between insulation on the payload section and the launch of the launch vehicle.

As shown, the attenuation ring assembly, when placed between the payload and booster sections comprises a circular or annular isolation system covering the entire interface plane and providing for an even distribution of load passing through the plane. The invention provides shock and vibration reduction between the payload and booster sections which reduces transient shock responses at the resonant frequency. This shock and vibration filter damping eliminates load peaking.

In order to reduce weight, several short arcuate segments of an attenuation ring assembly in accordance with the above described construction can be provided, rather than an entire circular or annular interface assembly. Two, three or several arcuate segments can be provided around the perimeter of the mating flanges between the booster section and the payload section. Preferably, the arcuate segments are uniformly positioned around the perimeter of the flanges on the booster and payload sections.

The present invention maintains vertical alignment of the payload and booster sections of the launch vehicle. This minimizes or eliminates deleterious moments from being introduced into the launch vehicle structure and thus allows the weight of the structure to be kept to a minimum.

The present invention also allows flexibility in selection of the launch vehicle structure. This is advantageous particularly if a change is necessary between different booster sections. A change in launch vehicle type can be made without the need for a coupled loads analysis.

The inner and outer ring members are preferably made of aluminum, but they can be made of any other equivalent or comparable materials as desired. If made from aluminum, the ring members are turned on a lathe from aluminum ring forgings. The sway space limiting members also are sized at this time. As indicated above, the radial and axial motions of the booster and payload members are controlled by the gaps 100 and 102 at the top and bottom of the attenuating ring assembly. The gaps control and reduce sway space motion or rocking.

The sway space limiting members 78 act as non-linear springs. As the limiting members travel through the relatively soft elastomeric path, they compress the elastomeric material against the metal ring members which are stiffer. The "spring" action of the sway space limiting members is softer when the elastomeric material 90 is not fully compressed, and stiffer when the elastomeric material is fully compressed. Also, when fully compressed, the sway space limiting members create hoop tension in the ring members.

The ring members 74 and 82 are assembled with a plurality of motion lockout spacer members 80 spaced around the circumference. Alignment pins (not shown) are used in the tooling fixture or jig to hold the inner and outer ring members in a concentric position. This allows the ring members to be concentrically bonded together with the elastomeric material 90. In this regard, in accordance with the present invention, it is desired to maintain concentricity such that the thickness of the elastomeric material is uniform in the toroidal volume or cavity between the inner and outer mounting ring members.

The elastomeric material can be positioned between the inner and outer mounting ring members in any conventional manner. Preferably, however, the elastomeric material is injected into the cavity in a liquid or semi-liquid condition. The attenuation ring assembly is then heated and cured to obtain the desired adhesion between the two mounting ring members.

The final step in the assembly of the invention is to machine finish the attenuating ring assembly. This removes any distortion caused by the curing process. Thereafter, the fail safe ring member (or members) is installed. The fail safe ring member is added after the elastomeric material is inserted and the inner and outer ring members are bonded together. The fail safe ring provides axial entrapment of the elastomeric material and ensures that the inner and outer ring members will not become inadvertently detached.

The motion lockout spacer members 80 are removed at the launch site. They are preferably held in place by shoulder bolts 81 or the like which have the capability to install and anchor the motion lockout spacer members when turned in one direction and to remove the motion lockout spacers when turned in the opposite direction. This is possible if a shoulder is present on the bolt which allows the bolt or fastener to retract the motion lockout spacer members as the bolts are turned in one direction.

As indicated above, the present invention provides a circular or annular isolation system which covers the entire interface plane between the booster and payload sections. The invention also provides an even distribution of load reaction which passes through the plane. The invention further filters vibrations and eliminates load peaking which occurs with discrete isolators. In particular, the present invention provides a load reduction means or mechanism at specific frequencies between the payload section and the launch vehicle.

In order to minimize rotation of the inner ring and outer ring relative to one another, it is preferable to provide an anti-rotation mechanism or the like positioned between the two rings. The mechanism could be a guide pin or rod connecting the two rings, a key-way mechanism, a raised spline or the like. The guide pin or other anti-rotation device could be positioned either axially or radially and retained loosely in slots or enlarged openings in order to permit dampening by the elastomeric material. In this regard, anti-rotation rods 62 and 108 are shown in FIGS. 3 and 4, respectively.

Figure 5:
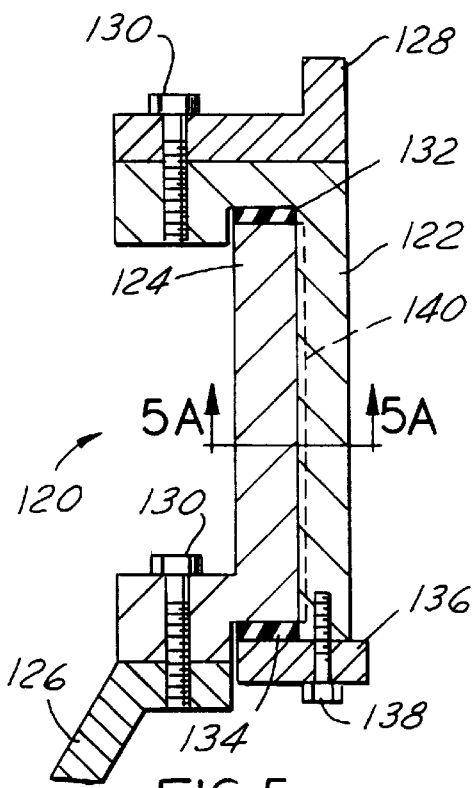
FIG. 5 is a cross-sectional view of still another embodiment of the present invention.
Figure 5A:
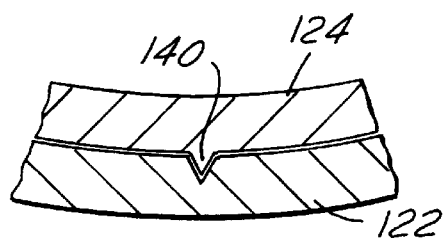
FIG. 5A is a sectional view taken along lines 5A—5A in FIG. 5 and in the direction of the arrows.

Another embodiment 120 of the invention is shown in FIGS. 5 and 5A. This embodiment performs the same functions, is used in the same manner, and achieves the same advantageous results as the embodiments 20 and 70 discussed above.

The ring assembly 120 includes an inner ring 122 and an outer ring 124 connecting together the booster section 126 and payload section 128 of the spacecraft. The assembly 120 is connected to the spacecraft sections by conventional fasteners, such as bolts 130.

Elastomeric material rings 132 and 134 are positioned between the inner and outer rings 122 and 124. The elastomeric ring 134 is held in place by retention ring 136. The elastomeric material is a vibration damping material.

Preferably, the inner and outer rings 122 and 124 are designed to provide a close fit between them. That is, the outer radius of the inner ring and the inner radius of the outer ring are designed and produced with a slight clearance. This is true whether the two rings are complete annular rings, or only arcuate sections or segments.

The assembly 120 takes advantage of the hoop tension of the circular or segmented assembly, since the inner and outer rings are compressed and preloaded by the retention (preload) ring 136. The retention ring is tightened and held in place by bolt or fastener 138. In this regard, the retention ring 136 can be a complete annular ring, or a plurality of arc segmented portions positioned around the circumference of the spacecraft.

With the assembly 120, the elastomeric damping material can be provided in flat annular rings and simply assembled into place in the manner shown in FIG. 5. No bonding or curing on the elastomeric material 132 and 134 is necessary. The retention ring 136 compresses and preloads both elastomeric rings 132 and 134. At the same time, the retention ring 134 compresses the inner and outer rings together and creates a tight interface between them. This tight interface prevents relative rotation between the inner and outer rings, adds friction damping, and also restricts or limits the available sway space.

The elastomeric material rings 132 and 134 are compressed to a pre-determined level to allow for the requisite axial damping movement. Isolation is accomplished by allowing relative motion to occur.

As mentioned, relative rotation between the two rings 122 and 124 is minimized or eliminated due to the tight interface or contact between them. To ensure that the two rings will not rotate relative to one another, an anti-rotation ridge or spline 140 could alternatively be utilized, as shown in FIG. 5A. The axial orientated spline is positioned in a corresponding or mating groove or recess 142 in the inner ring 122. In this regard, it is understood that the groove and spline could be reversed, i.e. the groove could be positioned in the outer ring and the spline could be positioned on the inner ring.

Although particular embodiments of the present invention have been illustrated in the accompanying drawings and described in the foregoing detailed description, it is to be understood that the present invention is not limited to just the embodiments disclosed, but that they are capable of numerous rearrangements, modifications, and substitutions without departing from the scope of the claims hereafter.

What is claimed is:

1. An attenuating ring assembly for a spacecraft launch vehicle, comprising:

an outer mounting ring member for mounting to a first portion of said spacecraft launch vehicle;

an inner mounting ring member for mounting to a second portion of said spacecraft launch vehicle;

an elastomeric material positioned between and securely affixed to said inner and outer mounting ring members;

at least one motion lockout spacer member removably positioned between said inner and outer mounting ring members; and at least one sway space limiting member being positioned between said inner and outer mounting ring members.

2. The attenuation ring member of claim 1 wherein said sway space limiting member is secured to said outer mounting ring member.

3. The attenuation ring member of claim 1 wherein said motion lockout spacer members are removably secured to said outer mounting ring member.

4. The attenuation ring member of claim 1 wherein when said motion lockout spacer member is removed, a first gap is provided between said inner and outer mounting ring members.

5. The attenuation ring member of claim 1 further comprising at least one fail-safe ring member positioned adjacent said elastomeric material.

6. The attenuation ring member of claim 5 wherein said fail-safe ring member is secured to said inner mounting ring member.

7. The attenuation ring member of claim 2 wherein a plurality of fail-safe ring members are provided.

8. The attenuation ring member of claim 1 wherein at least one gap is provided between said inner and outer mounting ring members.

9. The attenuation ring member of claim 1 wherein a plurality of motion lockout spacer members are provided.

10. The attenuation ring member of claim 1 further comprising a anti-rotation member for preventing relative rotation between said inner and outer mounting ring members.

* * * * *